United States Patent [19]

Skoyles et al.

[11] 4,001,642
[45] Jan. 4, 1977

[54] ANTI-LOCK VEHICLE BRAKE SYSTEMS

[75] Inventors: Derek Robert Skoyles; Denis Sharp, both of Salfords, near Redhill, England

[73] Assignee: U.S. Philips Corporation, New York, N.Y.

[22] Filed: May 5, 1975

[21] Appl. No.: 574,615

Related U.S. Application Data

[63] Continuation of Ser. No. 368,953, June 11, 1973, abandoned.

[30] Foreign Application Priority Data

June 19, 1972 United Kingdom ............ 28587/72

[52] U.S. Cl. .................................................. 317/5
[51] Int. Cl.² ..................... B60T 8/10; B60T 8/02
[58] Field of Search ........................................ 317/5

[56] References Cited

UNITED STATES PATENTS

| 3,608,979 | 9/1971 | Coyle | 317/5 |
| 3,710,186 | 1/1973 | Sharp | 317/5 |

OTHER PUBLICATIONS

*Transistor Circuit Analysis;* Joyce et al., Addison–Wesley Publishing Co., Inc. c. 1961, pp. 82 & 83.

*Primary Examiner*—R. N. Envall, Jr.
*Attorney, Agent, or Firm*—Frank R. Trifari; Robert S. Smith

[57] ABSTRACT

A detector for an anti-lock vehicle brake system in which a d.c. signal proportional to wheel speed is produced and compared against a rate of change reference signal. An output control signal is produced when the rate of change of the wheel speed signal exceeds the rate of change of the reference signal.

1 Claim, 4 Drawing Figures

ANTI-LOCK VEHICLE BRAKE SYSTEMS

This is a continuation of application Ser. No. 368,953, filed June 11, 1973 now abandoned.

This invention relates to anti-lock brake systems for wheeled vehicles, that is, brake systems including means for improving braking performance of a vehicle by causing a decrease of the braking force applied to a road wheel of the vehicle if the wheel tends to lock, in a circumstance likely to produce an incipient skid condition, following brake application, said means then causing the braking force to be increased again without the need for any change in the actual braking action (by a person using the brake) causing the brake application. Such brake systems can be successful in reducing the risk of skidding due to wheel lock and in maintaining directional control during braking, and can also reduce braking distances.

When a braking force is applied to a road wheel to reduce vehicle speed, a certain percentage of slip is introduced, that is, the braked wheel tends to rotate more slowly than the free rolling speed that should be obtained for the prevailing vehicle speed, due to the adhesion force between tire and road. As the braking force is increased, this adhesion force increases, accompanied by an increase in the percentage slip, until this adhesion force reaches a maximum at an optimum percentage slip (which typically is 10 to 20%), after which the adhesion force decreases with further increase of braking force and the percentage slip increases to 100% at which the braked wheel becomes locked.

FIG. 1 of the accompanying drawings illustrates diagrammatically typical force/slip curves for road surfaces affording different co-efficients of friction ($\mu$) to a vehicle wheel.

The force/slip curve 1 is for a typical high ($\mu$) surface (e.g. $\mu = 1$), the force/slip curve 2 is for a typical intermediate ($\mu$) surface (e.g. $\mu = 0.5$), and the force/slip curve 3 is for a typical low ($\mu$) surface (e.g. $\mu = 0.1$).

The aim of an anti-lock brake system, in respect of each road wheel controlled by it, is to anticipate wheel locking before it actually occurs and to control the braking force such that the wheel is kept turning in the region of maximum adhesion force between tire and road, that is, in the region where the optimum percentage slip occurs.

Many anti-lock vehicle brake systems have been proposed; some simple and others complex. Those operating on rear wheels only of a vehicle are usually simple and this is admissible partly because weight transfer to front wheels during braking makes rear wheel braking less important, and partly because the extra inertia of the vehicle transmission (in the case of rear wheel drive) can assist the anti-lock braking control action. A simple system is rarely adequate when operating on front wheels of a vehicle because, in this case, the anti-lock braking control has to be very accurate in order to achieve on a high ($\mu$) surface, vehicle stopping distances that are comparable with locked wheel stopping distances without any anti-lock braking control. Thus a complex system is usually necessary in this case and also in the case where the system operates on each road wheel of a vehicle individually.

Some anti-lock vehicle brake systems which have been proposed are wholly mechanical and use an inertia sensor for detecting when wheel locking is imminent due to an excessive braking force. Upon detecting such a condition the inertia sensor acts to reduce the braking force, for instance by opening a relief valve to reduce fluid pressure which is producing the braking force. Other anti-lock vehicle brake systems use an electronic control circuit for detecting when wheel locking is imminent due to excessive braking, together with a solenoid valve which is actuable by the control circuit to reduce fluid pressure at the brake. It is with these latter anti-lock vehicle brake systems that the present invention is concerned.

In order that an electronic control circuit of an anti-lock vehicle brake system can detect when wheel locking is imminent, the control circuit is arranged to be responsive to an input signal which is representative of wheel rotational movement. Suitably, such an input signal is derived from a train of pulses which are produced by a transducer and which have a frequency proportional to the speed of rotation of the wheel.

It is known for the derived input signal to be a d.c. input signal the amplitude of which is proportional to wheel speed. It is also known for this d.c. input signal to be differentiated to provide a rate of change signal, which is thus representative of wheel deceleration, and to provide in the control circuit a reference value of wheel deceleration, the control circuit being arranged to be responsive to effect solenoid energisation when wheel deceleration, as signified by the rate of change signal, exceeds the reference value of wheel deceleration. A control circuit of this known form is described in prior U.S. Pat. No. 3,710,186, but with the addition of what is termed a "back-lash" feature which was included to prevent spurious response of the control circuit due to momentary decreases of wheel speed at a rate in excess of the reference value of wheel deceleration, as may be produced by "whipping" in a vehicle suspension. The effect of this "back-lash" feature was to hold off response of the control circuit until the wheel speed had decreased by a predetermined amount at a rate in excess of the reference value of wheel deceleration.

The use of a reference value of wheel deceleration in combination with a differentiated d.c. input signal which is proportional to wheel speed is not an entirely satisfactory way of determining when wheel locking is imminent because the detection of a reference value of wheel deceleration alone does not provide an indication of wheel slip. An indication of a selected percentage wheel slip at which an anti-lock action is to be initiated can be provided by determining from a fixed change in the value of the d.c. input signal a certain decrease in wheel speed when the reference value of wheel deceleration is exceeded. Thus, the "back-lash" feature in the control circuit described in the above-identified U.S. Patent would inherently provide such an indication since it functions in this manner. However, this indication would not be an accurate one because a fixed change in the value of the d.c. input signal, corresponding to, say, a 10% change in wheel speed at 30 m.p.h. will correspond to only a 5% change in wheel speed at 60 m.p.h. As a consequence, the reference value of wheel deceleration will only give the selected percentage wheel slip at one wheel speed.

According to the present invention there is provided for an anti-lock vehicle brake system a wheel slip detector arrangement comprising means for producing a d.c. signal the amplitude of which is a function of wheel speed, means for establishing a reference rate of change parameter which is representative of a selected value of wheel deceleration, and means for determining over a range of wheel speeds in dependence on the instantaneous amplitude of said d.c. signal a selected percentage of the instantaneous amplitude and thus of the actual wheel speed to which the instantaneous amplitude obtains, the arrangement being responsive to produce an output for anti-lock braking control in response to a change in the instantaneous amplitude of said d.c. signal greater than said selected percentage and at a rate of change in excess of said reference rate of change parameter.

In one form of wheel slip detector arrangement according to the invention the d.c. signal is arranged to have an amplitude which varies with increase in wheel speed as a natural logarithmic function, said means for establishing a reference rate of change parameter comprises a differentiating circuit for producing a rate of change voltage from the d.c. signal, and said means for determining a selected percentage of the instantaneous amplitude of said d.c. signal comprises a resistor connected to provide a voltage drop in response to current flow through it due to said rate of change voltage, said voltage drop having a value which is representative of said selected percentage when the instantaneous rate of change voltage reaches a given value.

This form of wheel slip detector arrangement using a non-linear speed signal (i.e. the logarithmic d.c. signal) provides the detection of a selected percentage wheel slip over a range of wheel speeds using a simple differentiating circuit in combination with a single resistor of fixed value.

However, this use of a non-linear speed signal to ensure that a step voltage change (i.e. a change in excess of the reference rate of change) corresponds to a constant fraction of the d.c. (input) signal has the effect that the rate of change parameter determined by the differentiating circuit increases with increase in wheel speed. This could be a drawback when anti-lock operation takes place at a high speed on low ($\mu$) surface, because a relatively low reference rate of change parameter, corresponding to a relatively low value of wheel deceleration, is necessary to provide satisfactory slip detection for such a surface.

Therefore, in another form of wheel slip detector arrangement according to the invention, the d.c. signal is arranged to have an amplitude which is directly proportional to wheel speed, said means for establishing a reference rate of change parameter comprises a Miller capacitor which is connected to be discharged by the action of a transistor, and said means for determining a selected percentage of the instantaneous amplitude of said d.c. signal comprises a resistance divider chain which is connected effectively at one end to receive said d.c. signal and at the other end to the collector of transistor, said capacitor being connected between the base of said transistor and a point on said divider chain at which said selected percentage of the d.c. signal is present.

In this form of wheel slip detector arrangement the reference rate of change parameter remains constant.

In order that the invention may be more fully understood reference will now be made, by way of example, to the accompanying drawings of which:

Figure 1:
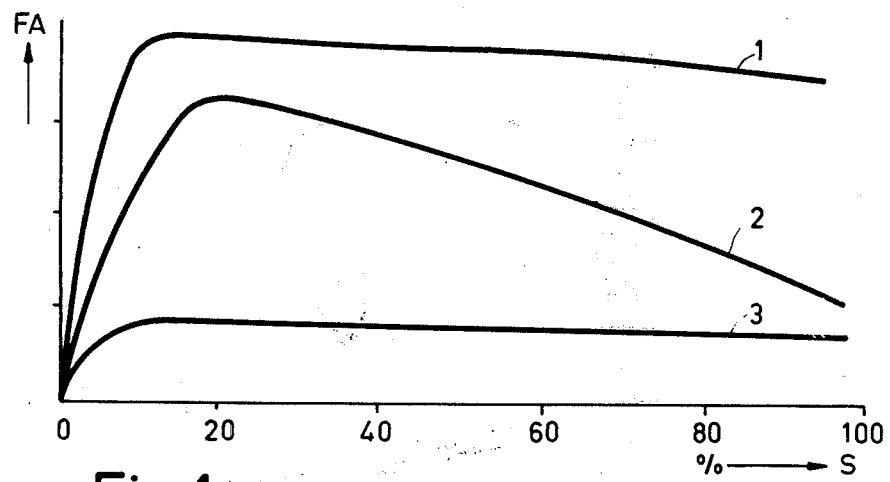
FIG. 1 shows, as aforesaid, typical force/slip curves.
Figure 2:
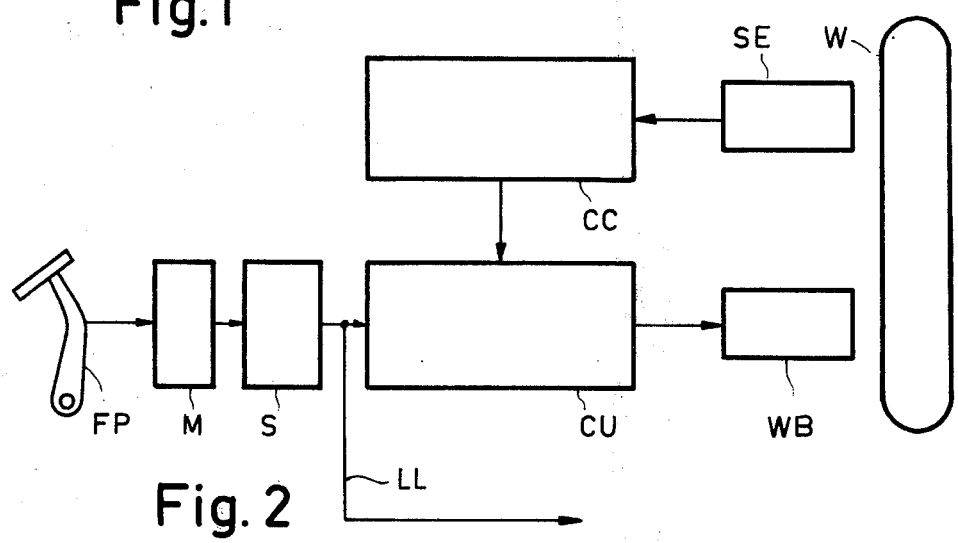
FIG. 2 is a diagrammatic general layout for an anti-lock vehicle brake system.

Referring to the drawings, the general layout for an anti-lock vehicle brake system shown in FIG. 2 shows a brake pedal FP for actuating a braking pressure modulator M which controls the application of fluid pressure from a fluid pressure source S of the system to a wheel brake WB. An anti-lock control unit CU is provided between the fluid pressure source S and the brake WB. A wheel movement sensor SE supplies an electrical signal related to rotational movement of a wheel W, for which the brake WB is provided, to an electronic control circuit CC. This electrical signal can be so derived (e.g. as a train of pulses) as to be proportional to wheel speed and converted by an input stage of the electronic control circuit CC to a d.c. signal the amplitude of which varies in proportion to, or as natural logarithmic function of, wheel speed. The anti-lock control unit CU would include a solenoid valve which is energised by an electrical output from the electronic control circuit CC to cause braking force applied to the wheel brake WB to be reduced. In the present instance, the control circuit CC is assumed to include a wheel slip detector arrangement according to the invention, which arrangement is responsive, as will be described, to the d.c. signal to cause the production of said electrical output for solenoid valve energisation.

For the circuit arrangements of FIGS. 3 and 4 to be described next, the wheel movement sensor SE suitably comprises an electro-magnetic pick-up for producing a train of electrical pulses, having a frequency proportional to wheel speed, by magnetic interaction between the pick-up and a ferro-magnetic toothed ring which is mounted for rotation with the wheel, the pick-up being positioned adjacent to the ring to sense change of flux as each tooth of the ring passes it and is succeeded by a gap when the wheel revolves.

Figure 3:
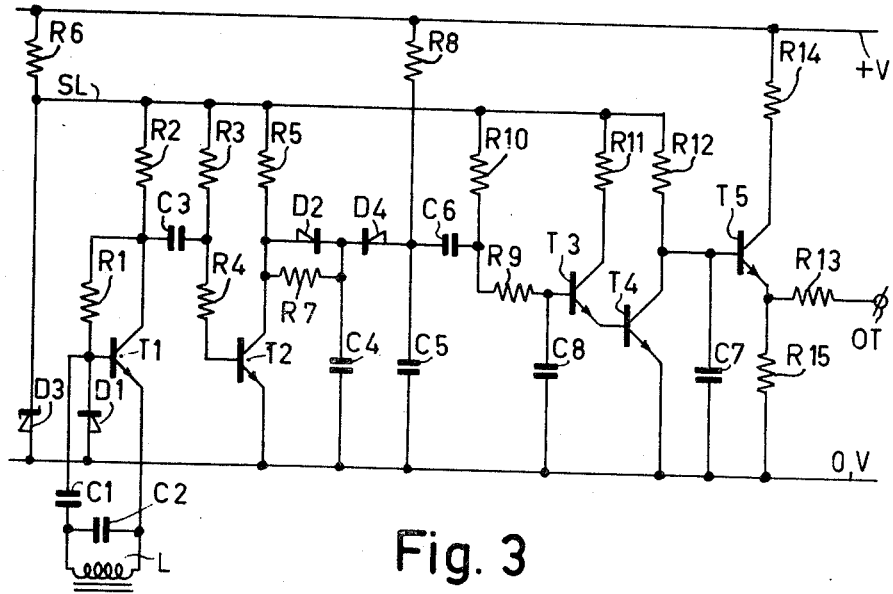
FIGS. 3 and 4 show respective forms of wheel slip detector arrangement according to the invention.

Turning now to FIG. 3, in the circuit arrangement there shown the pick-up is represented only by an output coil L. The pulse output from this pick-up output coil L is coupled into the base of a transistor T1 via a capacitor C1. A capacitor C2 serves to remove unwanted interference in the pulse output from the output coil L, and a diode D1 serves to prevent the d.c. bias at the base of transistor T1, as provided by a resistor R1 connected between the base and collector of this transistor, from shifting due to the rectification of the pulse input to the base by the base/emitter diode of the transistor T1.

The transistor T1 functions as a pulse limiter and amplifier and the output produced at its collector across a load resistor R2 is a square wave voltage which is coupled into the base of a transistor T2 via a capacitor C3. This capacitor C3 and base resistors R3 and R4 for the transistor T2 have values chosen such that the transistor T2, being normally conductive, is rendered non-conductive to produce a positive pulse of fixed length across a collector load resistor R5 for each cycle of square wave voltage coupled into its base. Each such positive pulse charges up a capacitor C4 through a diode D2 to a stabilised voltage on a line SL, this stabilised voltage being provided by a Zener diode D3 which is connected in series with a resistor R6 across voltage supply lines +V and OV. At the termination of each positive pulse at the collector of transistor T2, capacitor C4 commences to discharge exponentially through a resistor R7 and the transistor T2. When the voltage across the capacitor C4 becomes negative with respect to the voltage across a capacitor C5, a diode D4 becomes forward biased so that capacitor C5 also commences to discharge through the diode D4, but at a lower rate because its discharging time constant is longer than the discharging time constant of capacitor C4. However, each time capacitor C4 is being recharged, diode D4 is backed-off, thus allowing capacitor C5 to charge up via a resistor R8 with which it is connected in series across the voltage supply lines +V and OV. As a result, there is produced across capacitor C5 an output voltage whose amplitude increases as a natural logarithmic function with increase in frequency of the pulse input supplied by the pick-up. This output voltage may thus be termed a speed signal voltage whose amplitude increases with increase in wheel speed as a natural logarithmic function.

The speed signal voltage produced across the capacitor C5 is coupled into the base of a normally conductive transistor T3 via a capacitor C6 and a resistor R9. The value of this capacitor C6 and the value of a resistor R10, which is connected in series with the resistor R9 between the base of transistor T3 and the stabilised voltage line SL, are chosen to provide a reference rate of change parameter corresponding to a selected value of wheel deceleration (e.g. 1.5g.) at a selected wheel speed (e.g. corresponding to a vehicle speed of 30 m.p.h.) as represented by the amplitude of the speed signal voltage for that wheel speed. The capacitor C6 and the resistor R10 comprise a differentiating circuit, and when the rate of change of the voltage across the capacitor C6 exceeds the reference rate of change parameter, transistor T3 and a further normally conductive transistor T4 are rendered conductive, after a certain voltage drop has occurred across the resistor R9. The circuit operation to achieve this is that the transistor T3 is normally conductive due to current flow into its base, via resistors R9 and R10, from the stabilised voltage line SL. However, as the value of the speed signal voltage produced across capacitor C5 decreases due to increase in wheel deceleration, the voltage at the input side of the capacitor C6 decreases correspondingly to cause some of the current through the resistor R10 to be diverted from the base of transistor T3 to the output side of capacitor C6. When the selected value of wheel deceleration has been exceeded, so much of the current has been diverted from the base of transistor T5 that (ignoring the effect of resistor R9 for the time being) this transistor and transistor T4 are rendered non-conductive to cause a normally non-conductive transistor T5 to become conductive. The current through resistors R9 and R10 is normally about ten times the current needed to maintain the two transistors T3 and T4 conductive, so that the selected value of wheel deceleration at which transistor T5 becomes conductive is virtually independent of the gains of the transistors T3 and T4. A resistor R11 in the collector circuit of transistor T3 serves to limit the base current of transistor T4. A capacitor C7 connected between the collector of transistor T4 and the voltage supply line OV serves to prevent spurious oscillation of the circuit at high frequencies. A capacitor C8 connected between the base of transistor T3 and the voltage supply line OV makes the circuit less sensitive to ripple in the speed signal voltage produced across capacitor C5.

The resistor R9 provides, in accordance with its value, a voltage drop of a fixed amount which the voltage across capacitor C6 has to undergo at a rate in excess of the reference rate of change parameter before transistor T3 is rendered non-conductive. By making the amplitude of the speed signal voltage produced across capacitor C5 increase with increase in wheel speed as a natural logarithmic function, this fixed voltage drop can be chosen to be approximately a fixed (selected) percentage of the instantaneous amplitude of the speed signal voltage over a range of wheel speeds. Thus, the circuit arrangement operates to render transistor T5 conductive only when the amplitude of the speed signal voltage has decreased by a selected percentage at a rate of change in excess of the selected reference rate of change parameter.

The positive-going voltage produced across a collector resistor R12 of transistor T4 to render transistor T5 conductive results in a positive-going output voltage appearing at an output terminal OT which is connected through a resistor R13 to the emitter of transistor T5, which latter is connected as an emitter follower with collector and emitter resistors R14 and R15. This positive-going output voltage can be utilised, after amplification, to actuate a solenoid valve of an anti-lock vehicle brake system. It has been found that this method of wheel slip detection provides the basis for a satisfactory anti-lock braking control, except for the limitation that as a consequence of using an exponential speed signal voltage the rate of change parameter determined by the differentiating circuit (C6 and R10) will increase with increase in wheel speed, so that performance may be degraded for low ($\mu$) surfaces.

Figure 4:
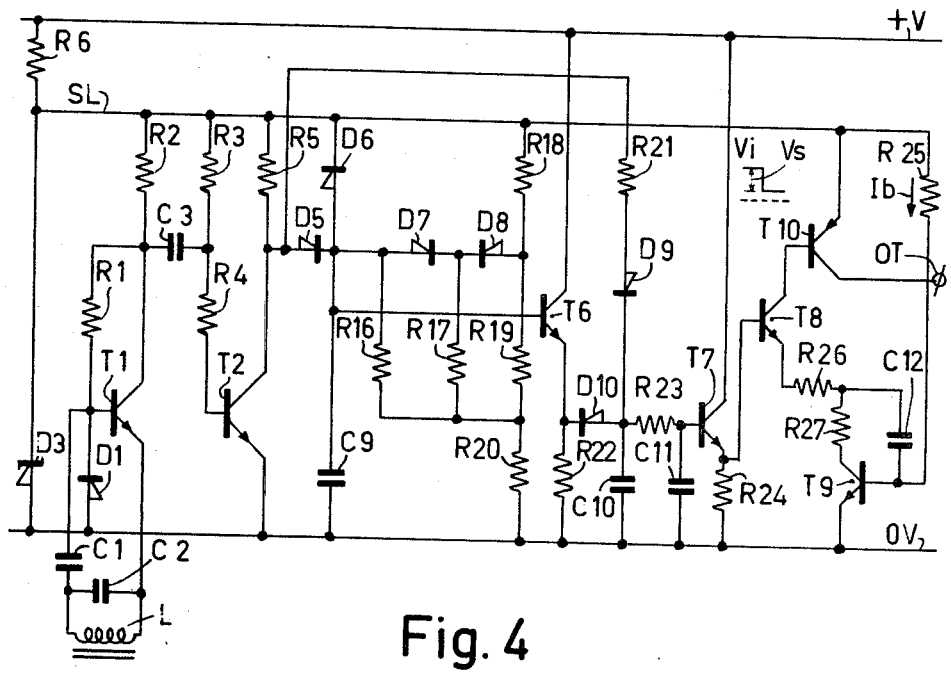

The wheel slip detector arrangement shown in FIG. 4 comprises input transistors T1 and T2 and associated components which are responsive to the pulse output from the pick-up output coil L, in the same manner as the corresponding components in FIG. 3, to cause the production of positive pulses of fixed length across collector load resistor R5. These pulses are applied via a diode D5 to charge a timing capacitor C9. A diode D6 serves to limit the voltage across the capacitor C9 to the voltage across the voltage supply lines +V and OV. During the period between successive positive pulses, the capacitor C9 is allowed to discharge. Initially, there are two discharge paths for this purpose, one via a resistor R16 and the other via a diode D7 and a resistor R17. However, the junction of the resistor R17 and diode D7 is connected via a diode D8 to the junction of two resistors R18 and R19, which together with a resistor R20 form a potential divider between the voltage supply lines +V and OV. Thus, when the voltage across the capacitor C9 has decayed below the value of the voltage present at the junction of resistors R18 and R19, diode D7 becomes reverse biased so that further decay of the charge on the capacitor C9 is now via resistor R16 only. In other words, the decay of the charge on the capacitor C9 is at two different exponential rates which together result in a decay curve which approximates to a rectangular hyperbola.

The resulting voltage across capacitor C9 is applied to the base of a transistor T6 which is connected as an emitter follower, so that the voltage at the emitter of transistor T6 follows the voltage at the base of the latter. The positive pulses at the collector of transistor T2 are also applied via a resistor R21 and a diode D9 to charge a storage capacitor C10. This capacitor C10 commences to discharge through a diode D10 and a resistor R22 each time the emitter voltage of transistor T6 falls below the voltage across the storage capacitor C10. The frequency of the applied positive pulses determines the duration of the period between successive pulses and thus the extent to which the capacitor C10 can discharge. The resulting voltage across capacitor C10 is applied via a resistor R23 to the base of a transistor T7 which is connected as an emitter follower and thus produces a corresponding voltage at its emitter across a resistor R24. A capacitor C11 connected between the base of transistor T7 and the voltage supply line 0V serves to suppress negative-going voltage spikes at the base of transistor T7. It has been found that this input portion of the wheel slip detector provides a good linear relationship between the amplitude of the voltage at the emitter of transistor T7 and the frequency of the positive pulses at the collector of transistor T2. Thus, this input portion of the arrangement provides an output voltage (speed signal voltage) which is directly proportional to wheel speed.

The speed signal voltage at the emitter of transistor T7 is applied to the base of transistor T8 which has its collector connected to the base of a transistor T10 which has its emitter connected to the stabilized voltage line SL. The emitter of the transistor T8 is connected via the series connection of two resistors R26 and R27 to the collector of a further transistor T9. The base of this transistor T9 is connected to one end of a biassing resistor R25 which is connected at its other end to the stabilized voltage line SL. A capacitor C12 is connected between the base of the transistor T9 and the junction of resistors R26 and R27. The emitter of the transistor T9 is connected to the voltage supply line 0V.

The operation of this output portion of the wheel slip detector is as follows. A positive voltage Vi at the base of transistor T8 will hold this transistor conductive to hold transistor T10 conductive also, and if this voltage Vi is steady, a bias current Ib through resistor R25 will saturate the transistor T9. In this condition of the circuit voltage Vc at the junction of resistors R26 and R27 is a fraction of the voltage Vi given by:

$$Vc = Vi \frac{R27}{R27 + R26},$$

ignoring the Vbe of transistor T8.

If the instantaneous amplitude of the voltage Vi changes by a negative voltage step Vs, the amplitude of this voltage step Vs must exceed $$Vi - \left(Vi \cdot \frac{R27}{R27 + R26}\right)$$

before the current through the transistor T9 decreases to zero, or substantially zero. Such an amplitude of the voltage step Vs corresponds to a certain fraction of wheel speed change, at a rate in excess of a reference rate of wheel speed change, from the wheel speed obtaining at said instantaneous amplitude. The reference rate of wheel speed change is determined as a reference rate of change parameter which is given by the linear decay of the voltage Vc across the Miller capacitor C12 which is discharged through action of the transistor T9. When this condition occurs, transistor T8 is cut-off to cut-off transistor T10, and there is produced at an output terminal OT which is connected to the collector of transistor T10 an output which can be utilised, after phase inversion and amplification, to actuate a solenoid valve of an anti-lock vehicle brake system. In practice, the change of the positive voltage Vi to voltage Vs will not normally be as a step, but provided the slope of the change exceeds the reference rate of change slope as determined by the value of the capacitor C12 and resistor R25, satisfactory circuit operation to effect wheel slip detection is achieved.

In the circuit arrangements of FIGS. 3 and 4, the input portions for producing, respectively, a non-linear and a linear speed signal voltage can be replaced by other circuits which can provide such voltages.

Suitable components and values for the circuit arrangements of FIGS. 3 and 4 are as given in the following table for a road wheel diameter of 2 feet having 60 teeth/revolution on a toothed ring rotatable therewith, for which a typical output voltage from the magnetic pick-up would be 1 volt peak at 100 cps. (7 m.p.h.) and 10 volts peak at 1000 cps. approximately (70 m.p.h.)

| RESISTORS. | | | | | | | | |
|---|---|---|---|---|---|---|---|---|
| R 1 = 1 | MΩ | R 9 = 33 | KΩ | R17 = 15 | KΩ | R25 = 1 | MΩ |
| R 2 = 18 | KΩ | R10 = 1 | MΩ | R18 = 1 | KΩ | R26 = 1 | K8Ω |
| R 3 = 56 | KΩ | R11 = 1 | MΩ | R19 = 1 | KΩ | R27 = 22 | KΩ |
| R 4 = 3 | KΩ | R12 = 33 | KΩ | R20 = 1 | KΩ | | |
| R 5 = | KΩ | R13 = 470 | Ω | R21 = 22 | KΩ | | |
| R 6 = 150 | Ω | R14 = 150 | Ω | R22 = 3.3 | KΩ | | |
| R 7 = | KΩ | R15 = 10 | KΩ | R23 = 47 | KΩ | | |
| R 8 = | KΩ | R16 = 15 | KΩ | R24 = 10 | KΩ | | |

| CAPACITORS | | TRANSISTORS |
|---|---|---|
| C 1 = 0.22 | μF | T1 = BC 108 (MULLARD) |
| C 2 = 0.1 | μF | T2 = BC 108 (MULLARD) |
| C 3 = 0.022 | μF | T3 = BC 109 (MULLARD) |
| C 4 = | μF | T4 = BC 109 (MULLARD) |
| C 5 = | μF | T5 = BC 109 (MULLARD) |
| C 6 = 1.0 | μF | T6 = BC 108 (MULLARD) |
| C 7 = 2.0 | KpF | T7 = BC 108 (MULLARD) |
| C 8 = 01 | μF | T8 = BC 108 (MULLARD) |
| C 9 = 0.22 | μF | T9 = BC 109 (MULLARD) |
| C10 = 1.0 | μF | T10 = BC Y32 (MULLARD) |
| C11 = 0.1 | μF | |
| C12 = 2.0 | μF | |

| DIODES. | |
|---|---|
| D 1 = OA 202 (MULLARD) | D 6 = OA 202 (MULLARD) |
| D 2 = OA 202 (MULLARD) | D 7 = OA 202 (MULLARD) |
| D 3 = 8.2 v Zener (MULLARD) | D 8 = OA 202 (MULLARD) |
| D 4 = OA 202 (MULLARD) | D 9 = OA 202 (MULLARD) |
| D 5 = OA 202 (MULLARD) | D 10 = OA 202 (MULLARD) |

VOLTAGES.

SL = 8.2 v Stabilised
+V = 12 volts.

What we claim is:

1. A wheel slip detector for an anti-lock vehicle brake system, said detector comprising means for producing a d.c. signal the amplitude of which is a function of wheel speed, means for establishing a reference rate of change signal which is representative of a selected value of wheel deceleration, and means for determining over a range of wheel speeds a selected percentage of the instantaneous amplitude of said d.c. signal, said selected percentage of the instantaneous amplitude being proportional to the actual wheel speed and means to produce an output for anti-lock braking control in response to change in the instantaneous amplitude of said d.c. signal greater than said selected percentage and at a rate of change in excess of said reference rate of change parameter, said means for establishing a reference rate of change signal comprises a Miller capacitor which is connected to be discharged by the action of a transistor, and said means for determining a selected percentage of the instantaneous amplitude of said d.c. signal comprises a resistance divider chain which is connected effectively at one end to receive said d.c. signal and at the other end to the collector of said transistor, said capacitor being connected between the base of said transistor and a point on said divider chain at which said selected percentage of the d.c. signal is present.

* * * * *

UNITED STATES PATENT AND TRADEMARK OFFICE
CERTIFICATE OF CORRECTION

PATENT NO. : 4,001,642
DATED : January 4, 1977
INVENTOR(S) : DEREK ROBERT SKOYLES ET AL It is certified that error appears in the above—identified patent and that said Letters Patent are hereby corrected as shown below:

Column 8, under the heading "CAPACITORS" "C8=01" should be --C8=0.1--.

Signed and Sealed this

Third Day of May 1977

[SEAL]

Attest:

RUTH C. MASON
Attesting Officer

C. MARSHALL DANN
Commissioner of Patents and Trademarks